United States Patent [19]

Davatz

[11] Patent Number: 4,604,066
[45] Date of Patent: Aug. 5, 1986

[54] HAND CONTROL FOR FOOT CONTROL TROLLING MOTOR

[76] Inventor: Christian R. Davatz, 900 E 8th St., Cherryvale, Kans. 67335

[21] Appl. No.: 774,132

[22] Filed: Sep. 9, 1985

[51] Int. Cl.⁴ .............................................. B60L 15/20
[52] U.S. Cl. ...................................... 440/7; 114/146; 114/153; 74/481; 440/53
[58] Field of Search .............. 440/6, 7, 53, 87; 114/144 RE, 146, 153; 74/481, 482, 512; 180/320

[56] References Cited

U.S. PATENT DOCUMENTS

| | | | |
|---|---|---|---|
| 2,783,659 | 3/1957 | Kelsey et al. | 74/481 |
| 3,472,094 | 10/1969 | Lake et al. | 74/481 |
| 3,535,951 | 10/1970 | Larson et al. | 74/482 |
| 3,561,393 | 2/1971 | Fortson | 440/7 |
| 4,130,079 | 12/1978 | Rhorer et al. | 114/146 X |
| 4,527,983 | 7/1985 | Booth | 440/7 |

Primary Examiner—Trygve M. Blix
Assistant Examiner—Paul E. Salmon
Attorney, Agent, or Firm—Richard L. Miller

[57] ABSTRACT

A hand control for a foot control of a trolling motor on a boat is provided being of a construction so that an operator can turn the trolling motor switch ON and OFF and steer the boat by hand instead of by foot.

4 Claims, 4 Drawing Figures

U.S. Patent  Aug. 5, 1986  4,604,066
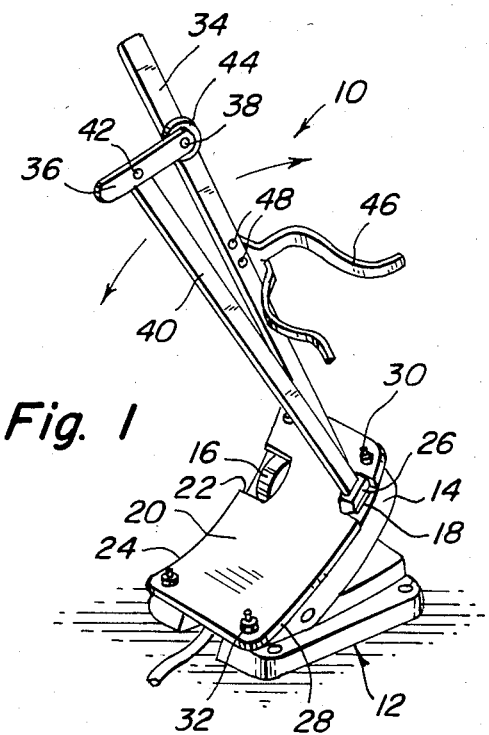
Fig. 1
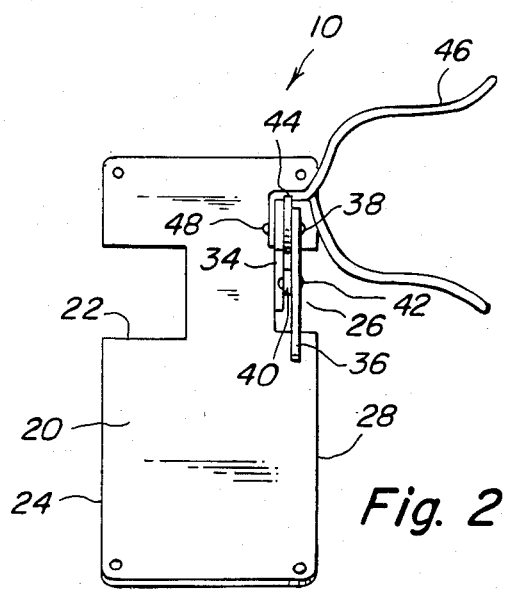
Fig. 2
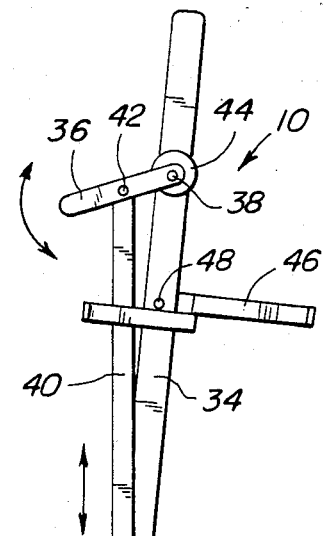
Fig. 3
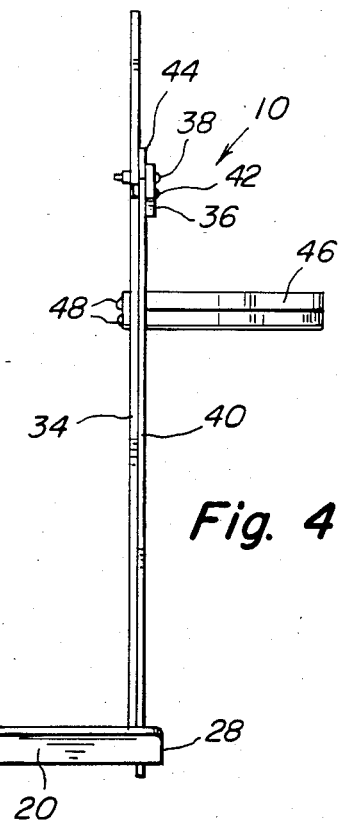
Fig. 4
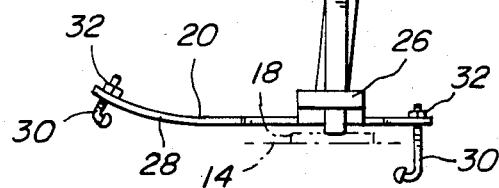

HAND CONTROL FOR FOOT CONTROL TROLLING MOTOR

BACKGROUND OF THE INVENTION

The instant invention relates generally to controls for motors and more specifically it relates to a hand control for a foot control of a trolling motor on a boat.

The standard foot control of a trolling motor performs three functions when a persons foot engages it. The foot turns on the motor, controls the speed of the motor, and steers the boat.

Numerous controls for motors have been provided in prior art that are adopted to manually regulate the motors by foot and hand. For example, U.S. Pat. Nos. 3,153,350, 3,548,778 and 3,561,393 all are illustrative of such prior art. While these units may be suitable for the particular purpose to which they address, they would not be as suitable for the purposes of the present invention as heretofore described.

SUMMARY OF THE INVENTION

A principle object of the present invention is to provide a hand control for a foot control of a trolling motor and boat that will turn the trolling motor switch on and steer the boat by a hand of a person instead of by a foot of the person.

Another object is to provide a hand control for a foot control of a trolling motor on a boat that will continuously keep the trolling motor switch on when the person steers the boat by hand.

An additional object is to provide a hand control for a foot control of a trolling motor on a boat that will steer the boat by moving the person's knee from side to side within a bifurcated yoke thereon.

A further object is to provide a hand control for a foot control of a trolling motor on a boat that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the invention attached to a foot control for a trolling motor.

FIG. 2 is a top view of the invention.

FIG. 3 is a side view thereof.

FIG. 4 is an end view thereof.

DESCRIPTION OF THE PREFERRED EMBODIMENTS

Turning now descriptively to the drawings, in which similar reference characters denote similar elements throughout the several views, FIGS. 1 through 4 illustrate a hand control 10 for a foot control 12 of a trolling motor on a boat (not shown). The foot control 12 is of the type that has a steering pedal 14, a three speed control knob 16 and an on-off motor switch 18.

The hand control 10 includes a base shoe 20 that has a cut out area 22 on one side 24 for the three speed control knob 16 and a guide member 26 on opposite side 28. The base shoe 20 is removably mounted to the steering pedal 14 by using four J-bolts 30 with corresponding nuts 32. Each J-bolt 30 is affixed to each corner of the base shoe 20.

An elongated stationary rod 34 is affixed to an extends upwardly from the base shoe 20 so as to manually operate by hand the steering pedal 14.

An arm 36 is pivotally mounted at 38 to upper portion of the stationary rod 34 and extends outwardly from the stationary rod. An elongated movable rod 40 is pivotally mounted at 42 to the arm 36 and extends downwardly through the guide member 26 to contact the on-off motor switch 18. When the arm 36 is activated by hand the movable rod 40 will operate the on-off motor switch 18.

A friction washer 44 is placed between the stationary rod 34 and the arm 36 at the pivotally mounted point 38, when the arm 36 is activated by hand the movable rod 40 will continuously keep the on-off motor switch 18 ON in one (down) position and continuously keep the on-off motor switch OFF in another (up) position.

A bifurcated yoke 46 is affixed to the stationary rod 34 at 48 and extends outwardly therefrom so that the knee of the operator (not shown) can engage the bifurcated yoke 46 and move from side to side to operate the steering pedal 14.

To operate the hand control 10 reference is made to FIGS. 1 and 3. When the arm 36 is pulled down the movable rod 40 will turn the on-off switch 18 on. When the stationary rod 34 is pulled to the right the steering pedal 14 will go down and the boat will go to the right. When the stationary rod 34 is pulled to the left the steering pedal 14 will go up and the boat will go to the left.

The hand control 10 illustrated is designed to fix onto a Johnson foot control model number E-45-R. If other types of foot controls are to be used modifications must be made in the base shoe 20 to accommodate their steering pedals.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A hand control for a foot control of a trolling motor on a boat, said foot control of the type having a steering pedal, a three speed control knob and an on-off motor switch, said hand control comprising:
   (a) a base shoe having a cut out area on one side for said three speed control knob and a guide member on opposite side, said base shoe removably mounted to said steering pedal;
   (b) an elongated stationary rod affixed to and extending upwardly from said base shoe so as to manually operate by hand said steering pedal;
   (c) an arm pivotally mounted to upper portion of said stationary rod and extending outwardly from said stationary rod; and
   (d) an elongated movable rod pivotally mounted to said arm and extending downwardly through said guide member to contact said on-off motor switch so that when said arm is activated by said hand movable rod will operate said on-off motor switch.

2. A hand control as recited in claim 1 further comprising four J-bolts with corresponding nuts, each said J-bolt affixed to each corner of said base shoe so that said base shoe can be removably mounted to said steering pedal.

3. A hand control as recited in claim 2 further comprising a friction washer placed between said stationary rod and said arm at said pivotally mounted point so that when said arm is activated by said hand said movable rod will continuously keep said on-off motor switch ON in one position and continuously keep said on-off motor switch OFF in another position.

4. A hand control as recited in claim 3 further comprising a bifurcated yoke affixed to said stationary rod and extending outwardly therefrom so that an operator's knee engaging said bifurcated yoke and moving from side to side can operate said steering pedal.

* * * * *